(12) United States Patent
Dou et al.

(10) Patent No.: US 10,937,182 B2
(45) Date of Patent: Mar. 2, 2021

(54) NON-RIGID ALIGNMENT FOR VOLUMETRIC PERFORMANCE CAPTURE

(71) Applicant: Google LLC, Mountain View, CA (US)

(72) Inventors: Mingsong Dou, Mountain View, CA (US); Sean Ryan Fanello, Mountain View, CA (US); Adarsh Prakash Murthy Kowdle, San Francisco, CA (US); Christoph Rhemann, Mountain View, CA (US); Sameh Khamis, Mountain View, CA (US); Philip L. Davidson, Arlington, MA (US); Shahram Izadi, Tiburon, CA (US); Vladimir Tankovich, Renton, WA (US)

(73) Assignee: GOOGLE LLC, Mountain View, CA (US)

( * ) Notice: Subject to any disclaimer, the term of this patent is extended or adjusted under 35 U.S.C. 154(b) by 379 days.

(21) Appl. No.: 15/994,471

(22) Filed: May 31, 2018

(65) Prior Publication Data

US 2018/0350088 A1 Dec. 6, 2018

Related U.S. Application Data

(60) Provisional application No. 62/513,176, filed on May 31, 2017.

(51) Int. Cl.
*G06T 7/593* (2017.01)
*G06T 7/73* (2017.01)
(Continued)

(52) U.S. Cl.
CPC ............... *G06T 7/596* (2017.01); *G06T 7/75* (2017.01); *G06T 15/08* (2013.01); *G06T 17/20* (2013.01);
(Continued)

(58) Field of Classification Search
CPC ........... G06T 7/596; G06T 7/75; G06T 15/08; G06T 17/20; G06T 2207/10016;
(Continued)

(56) References Cited

U.S. PATENT DOCUMENTS

| 9,393,697 B1* | 7/2016 | Beardsley | H04N 5/23222 |
| 2006/0028473 A1* | 2/2006 | Uyttendaele | G06T 15/205 345/473 |

(Continued)

OTHER PUBLICATIONS

Bär, Tobias, Jan Felix Reuter, and J. Marius Zöllner. "Driver head pose and gaze estimation based on multi-template icp 3-d point cloud alignment." In 2012 15th International IEEE Conference on Intelligent Transportation Systems, pp. 1797-1802. IEEE, 2012. (Year: 2012).*

(Continued)

*Primary Examiner* — Carol Wang (57) ABSTRACT

An electronic device estimates a pose of one or more subjects in an environment based on estimating a correspondence between a data volume containing a data mesh based on a current frame captured by a depth camera and a reference volume containing a plurality of fused prior data frames based on spectral embedding and performing bidirectional non-rigid matching between the reference volume and the current data frame to refine the correspondence so as to support location-based functionality. The electronic device predicts correspondences between the data volume and the reference volume based on spectral embedding. The correspondences provide constraints that accelerate the convergence between the data volume and the reference volume. By tracking changes between the current data mesh frame and the reference volume, the electronic device avoids tracking failures that can occur when relying solely on a previous data mesh frame.

20 Claims, 4 Drawing Sheets

(51) Int. Cl.
G06T 15/08 (2011.01)
G06T 17/20 (2006.01)
(52) U.S. Cl.
CPC ............... G06T 2207/10016 (2013.01); G06T 2207/10024 (2013.01); G06T 2207/10028 (2013.01); G06T 2219/2004 (2013.01)
(58) Field of Classification Search
CPC . G06T 2207/10024; G06T 2207/10028; G06T 2219/2004
See application file for complete search history.

(56) References Cited

U.S. PATENT DOCUMENTS

| | | | | |
|---|---|---|---|---|
| 2011/0254841 | A1* | 10/2011 | Lim | G06T 17/20 345/421 |
| 2014/0160123 | A1* | 6/2014 | Yang | G06T 17/00 345/420 |
| 2017/0206679 | A1* | 7/2017 | Pansiot | A61B 5/0035 |
| 2017/0308736 | A1* | 10/2017 | Sharma | G06K 9/4652 |
| 2017/0345183 | A1* | 11/2017 | Chen | G06T 7/55 |
| 2018/0247427 | A1* | 8/2018 | Geiger | G06K 9/00201 |

OTHER PUBLICATIONS

International Preliminary Report on Patentability dated Dec. 12, 2019 for corresponding International Application No. PCT/US2018/043626, 10 pages.
International Search Report and Written Opinion dated Oct. 29, 2018 for corresponding International Application No. PCT/US2018/043626, 16 pages.
Dey, Tamal K. et al., "Automatic posing of a meshed human model using point clouds," Computers and Graphics, vol. 46; Feb. 1, 2015; pp. 14-24.
Dou, M. et al., "Motion2fusion: real-time volumetric performance capture," ACM Transactions on Graphics (TOG); vol. 36, No. 6; Nov. 20, 2017; pp. 1-16.
Kowdle, et al., "The Need for Speed in Computer Vision", SIGGRAPH ASIA 2017, Nov. 2017, 13 pages.
Bailer, et al., "Flow Fields: Dense Correspondence Fields for Highly Accurate Large Displacement Optical Flow Estimation", 2015 IEEE International Conference on Computer Vision, Dec. 2015, 9 pages.
Baran et al., "Automatic Rigging and Animation of 3D Characters", ACM Transactions on Graphics (TOG), vol. 26, Issue 3, Jul. 2007, 8 pages.
Cao et al., "Real-Time High-Fidelity Facial Performance Capture," AMC Transactions on Graphics (TOG), vol. 34, Issue 4, Aug. 2015, 9 pages.
Cao et al., et al., "3D Shape Regression for Real-Time Facial Animation." ACM Transactions on Graphics (TOG), vol. 32, Issue 4, Jul. 2013, 10 pages.
Carr et al., "Meshed Atlases for Real-Time Procedural Solid Texturing", ACM Transactions on Graphics (TOG) vol. 21, Issue 2, Apr. 2002, 26 pages.
Collet et al., "High Quality Streamable Free-Viewpoint Video", ACM Transactions on Graphics (TOG), vol. 34 Issue 4, Aug. 2015, 13 pages.
Curless et al., "A Volumetric Method for Building Complex Models from Range Images", SIGGRAPH '96, New York, 1996, 10 pages.
Dou et al., "Fusion4D: Real-time Performance Capture of Challenging Scenes", SIGGRAPH '16 Technical Paper, Jul. 2016, 13 pages.
Fanello et al., "Hyperdepth: Learning Depth from Structured Light Without Matching", IEEE Conference on Computer Vision and Pattern Recognition (CVPR), Jun. 2016, 10 pages.
Dosovitskiy et al. "Flownet: Learning Optical Flow with Convolutional Networks", IEEE International Conference on Computer Vision (ICCV), Apr. 2015, 9 pages.
Guo et al., "Robust Non-rigid Motion Tracking and Surface Reconstruction Using L0 Regularization", IEEE International Conference on Computer Vision (ICCV), Dec. 2015, 9 pages.
Guo et al., "Real-time Geometry, Albedo, and Motion Reconstruction Using a Single RGBD Camera", ACM Transactions on Graphics (TOG) vol. 36, Issue 3, Jun. 2017, 13 pages.
Innmann et al., "VolumeDeform: Real-time Volumetric Non-rigid Reconstruction", European Conference on Computer Vision (ECCV), Oct. 2016, 17 pages.
Jain et al., "Robust 3D Shape Correspondence in the Spectral Domain", IEEE International Conference on Shape Modeling and Applications, Jun. 2006, 12 pages.
Kavan et al., "Skinning with Dual Quaternions", 2007 Symposium on Interactive 3D Graphics and Games (I3D), May 2007, 8 pages.
Lazebnik et al., "Beyond Bags of Features: Spatial Pyramid Matching for Recognizing Natural Scene Categories", IEEE Computer Society Conference on Computer Vision and Pattern Recognition (CVPR), Jun. 2006, 8 pages.
Leordeanu et al., "An Integer Projected Fixed Point Method for Graph Matching and MAP Inference", Proceedings Neural Information Processing Systems, Dec. 2009, 9 pages.
Levy et al., "Least Squares Conformal Maps for Automatic Texture Atlas Generation", ACM Transactions on Graphics (TOG), vol. 21, Issue 3, Jul. 2002, 10 pages.
Li et al., "Robust Single-View Geometry and Motion Reconstruction", ACM Transactions on Graphics (TOG), vol. 28, Issue 5, Dec. 2009, 10 pages.
Li et al., "3D Self-Portraits", ACM Transactions on Graphics (TOG), vol. 32, Issue 6, Nov. 2013, 9 pages.
Mehta et al., "VNect: Real-time 3D Human Pose Estimation with a Single RGB Camera", ACM Transactions on Graphics (TOG), vol. 36, Issue 4, Jul. 2017, 13 pages.
Meyer et al., "Discrete Differential-Geometry Operators for Triangulated 2-Manifolds", Visualization and Mathematics III, Springer, Berlin, Heidelberg, 2003, 27 pages.
Newcombe et al., "DynamicFusion: Reconstruction and Tracking of Non-Rigid Scenes in Real-Time", IEEE Conference on Computer Vision and Pattern Recognition (CVPR), Jun. 2015, 10 pages.
Newcombe et al., "KinectFusion: Real-time Dense Surface Mapping and Tracking", IEEE International Symposium on Mixed and Augmented Reality, Oct. 2011, 10 pages.
Orts-Escolano et al., "Holoportation: Virtual 3D Teleportation in Real-time", 29th Annual Symposium on User Interface Software and Technology, Oct. 2016, 14 pages.
Rahimi et al., "Random Features for Large-Scale Kernel Machines", International Conference on Neural Information Processing System (NIPS), Dec. 2007, 8 pages.
Sander et al., "Texture Mapping Progressive Meshes", SIGGRAPH '01, 2001, 8 pages.
Sheffer et al., "Seamster: Inconspicuous Low-Distortion Texture Seam Layout." IEEE Visualization (VIS), Nov. 2002, 8 pages.
Shotton et al., "Real-Time Human Pose Recognition in Parts from Single Depth Images", IEEE Conference on Computer Vision and Pattern Recognition (CVPR), Jun. 2011, 8 pages.
Soucy et al., "A Texture-Mapping Approach for the Compression of Colored 3D Triangulations", The Visual Computer, vol. 12, Issue 10, Springer, Dec. 1996, 12 pages.
Sumner et al., "Embedded Deformation for Shape Manipulation", ACM Transactions on Graphics (TOG), vol. 26, Issue 3, Jul. 2007, 7 pages.
Tan et al., "Fits Like a Glove: Rapid and Reliable Hand Shape Personalization", IEEE Conference on Computer Vision and Pattern Recognition (CVPR), Jun. 2016, 10 pages.
Taylor et al., "Efficient and Precise Interactive Hand Tracking Through Joint, Continuous Optimization of Pose and Correspondences", ACM Transactions on Graphics (TOG), vol. 35, Issue 4, Jul. 2016, 2 pages.
De Aguiar et al., "Performance Capture from Sparse Multi-view Video", ACM Transactions on Graphics (TOG), vol. 27, Issue 3, Aug. 2008, 10 pages.
Thies et al., "Face2Face: Real-time Face Capture and Reenactment of RGB Videos", IEEE Conference on Computer Vision and Pattern Recognition (CVPR), Jun. 2016, 9 pages.

(56) References Cited

OTHER PUBLICATIONS

Wang et al., "The Global Patch Collider", IEEE Conference on Computer Vision and Pattern Recognition (CVPR), Jun. 2016, 9 pages.
Woolfe et al., "A Fast Randomized Algorithm for the Approximation of Matrices", Applied and Computational Harmonic Analysis, vol. 25, Issue 3, Nov. 2008, 32 pages.
Xie et al., "DeepShape: Deep-Learned Shape Descriptor for 3D Shape Matching and Retrieval", IEEE Conference on Computer Vision and Pattern Recognition (CVPR), Jun. 2015, 9 pages.
Ye et al.,"Real-time Simultaneous Pose and Shape Estimation for Articulated Objects Using a Single Depth Camera", IEEE Conference on Computer Vision and Pattern Recognition (CVPR), Apr. 2014, 8 pages.
Ye et al., "A Survey on Human Motion Analysis from Depth Data", Time-of-Flight and Depth Imaging. Sensors, Algorithms, and Applications, Lecture Notes in Computer Science, vol. 8200, 2013, 39 pages.
Zagoruyko et al., "Learning to Compare Image Patches via Convolutional Neural Networks", IEEE Conference on Computer Vision and Pattern Recognition (CVPR), Jun. 2015, 9 pages.
Zaslavskiy et al., "A Path Following Algorithm for the Graph Matching Problem", IEEE Transactions on Pattern Analysis and Machine Intelligence, vol. 31, Issue 12, Dec. 2009, 16 pages.
Zbontar et al., "Computing the Stereo Matching Cost with a Convolutional Neural Network", IEEE Conference on Computer Vision and Pattern Recognition (CVPR), Jun. 2015, 8 pages.
Zhou et al., "Factorized Graph Matching", IEEE Conference on Computer Vision and Pattern Recognition (CVPR), Jun. 2012, 8 pages.
Zhou et al., "Iso-charts: Stretch-driven Mesh Parameterization using Spectral Analysis", Eurographics/ACM SIGGRAPH Symposium on Geometry Processing (SGP), Jul. 2004, 10 pages.
Zollhofer et al., "Real-time Non-rigid Reconstruction using an RGB-D Camera", ACM Transactions on Graphics (TOG), vol. 33, Issue 4, Jul. 2014, 12 pages.

\* cited by examiner

NON-RIGID ALIGNMENT FOR VOLUMETRIC PERFORMANCE CAPTURE

CROSS REFERENCE TO RELATED APPLICATIONS

This application is related to and claims priority to U.S. Provisional Patent Application No. 62/513,176, entitled "Motion2Fusion: Real-time Volumetric Performance Capture" and filed on May 31, 2017, the entirety of which is incorporated by reference herein.

BACKGROUND

Real-time performance capture for modeling the pose, shape, appearance, and motions of humans is used as inputs for computer vision tasks such as hand, body, or object tracking, 3D reconstruction, and simultaneous localization and mapping (SLAM). For such tasks, each new frame of depth and image data is used for non-rigid scene reconstruction over time. However, non-rigid scene reconstructions are computationally taxing, suffer from over-smoothing of high frequency details such as faces, and are prone to tracking failures when confronting topology changes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving estimating a correspondence between a current data frame and a reference volume containing a plurality of fused prior data frames based on spectral embedding and performing bidirectional non-rigid matching between the reference volume and the current data frame to refine the correspondence. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-4 illustrate techniques for estimating a pose of one or more subjects, such as a person, in an environment by a motion tracking system based on estimating a correspondence between a current data frame and a reference volume containing a plurality of fused prior data frames based on spectral embedding and performing bidirectional non-rigid matching between the reference volume and the current data frame to refine the correspondence so as to support location-based functionality, such as augmented reality (AR) functionality, virtual reality (VR) functionality, visual localization/odometry or other simultaneous localization and mapping (SLAM) functionality, and the like. The motion tracking system is an electronic device that computes a data mesh based on extracted zero-crossings of a volume. The volume is a three-dimensional (3D) truncated signed distance function, which is an implicit surface (3D model) representing an environment of an electronic device based on depth data captured by one or more depth cameras. The electronic device maintains both a data volume and an evolving reference volume. The data volume contains a data mesh based on a current frame captured by one or more of the depth cameras (referred to as a current data mesh frame), and the reference volume is populated with an initial data mesh frame and subsequent data mesh frames that are fused to the initial data mesh frame. The electronic device predicts correspondences between the data volume and the reference volume based on spectral embedding. The correspondences provide constraints that accelerate the convergence between the data volume and the reference volume. In some embodiments, the electronic device optimizes a convergence between the data volume and the reference volume based on a color term that corrects drift in areas with finer geometry, such as faces. By tracking changes between the current data mesh frame and the reference volume, the electronic device avoids tracking failures that can occur when relying solely on a previous data mesh frame.

In some embodiments, the electronic device performs bi-directional matching between the reference volume and the data volume ("forward matching"), and between the data volume and the reference volume ("backward matching") to account for surface topology changes. The electronic device uses correspondences identified from the bi-directional matching as residuals in a final non-rigid matching phase to align the reference volume with the data volume. After aligning the reference volume with the data volume, the electronic device fuses the data volume into the reference volume and warps the reference volume to the data to estimate a pose of an object in the environment of the electronic device. In some embodiments, the electronic device incorporates high frequency details and texture mapping to render a high-fidelity reconstruction of a moving subject, such as a person deforming an object such as an article of clothing, at relatively high speed.

Figure 1:
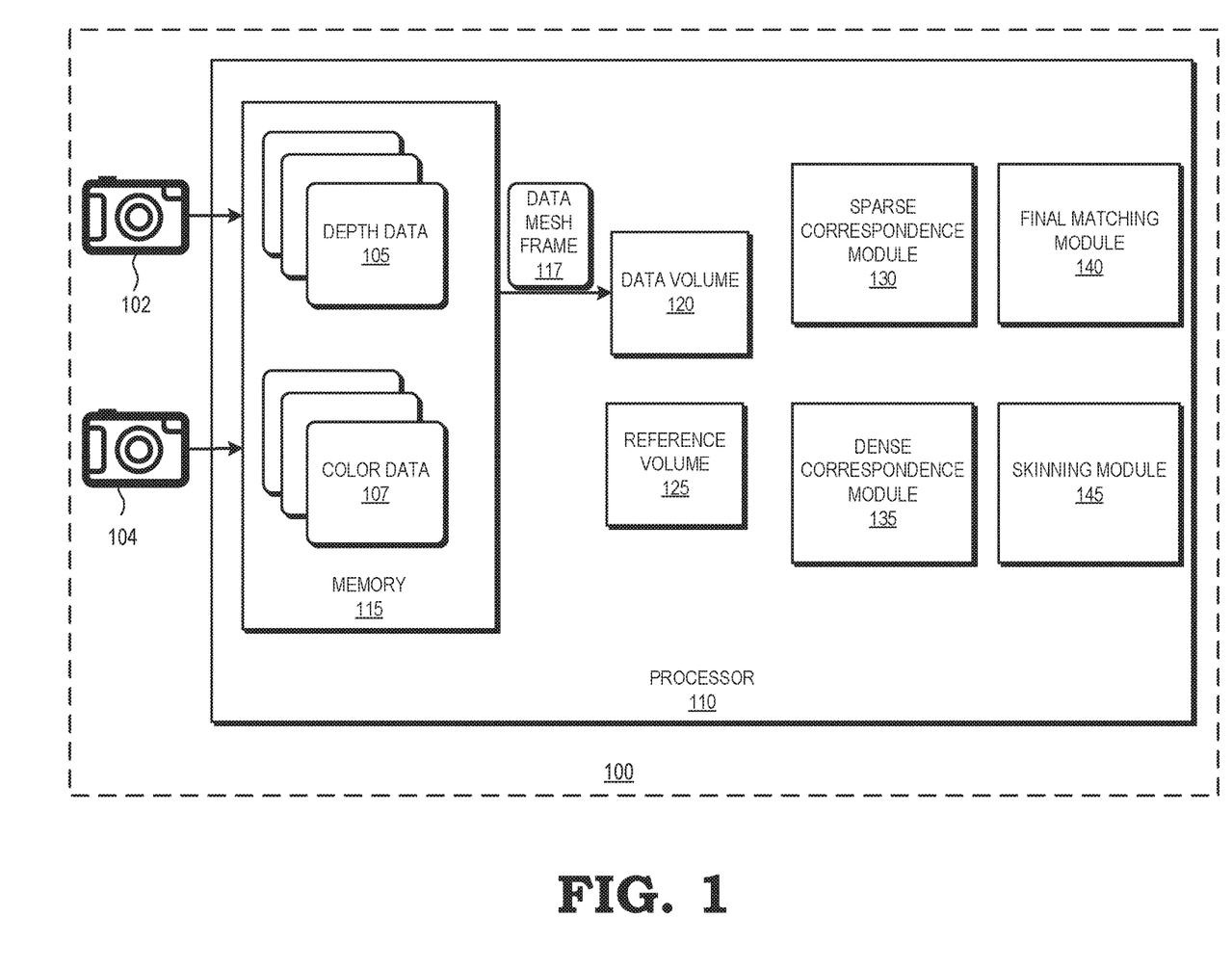
FIG. 1 is a block diagram illustrating motion tracking system using spectral embedding and backward and forward matching to correlate a data volume and an evolving reference volume to estimate a pose of objects in an environment in accordance with some embodiments.

FIG. 1 illustrates an electronic device 100 configured to support real-time reconstruction of arbitrary non-rigid scenes using depth map data for use in virtual reality (VR) and/or augmented reality (AR) applications in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as a head-mounted display, single camera, multi-sensor camera, and the like. For ease of illustration, the electronic device 100 is generally described herein in the example context of a mobile device, such as a tablet computer or a smartphone; however, the electronic device 100 is not limited to these example implementations. The electronic device 100 includes a plurality of sensors (such as, e.g., a depth camera 102 and a color camera 104) to obtain information regarding a local environment (not shown) of the electronic device 100 and a processor 110 to analyze the information obtained by the sensors 102, 104 and estimate a pose of a subject in the environment of the electronic device 100.

The electronic device 100 obtains visual information (imagery) for the local environment in the form of depth data 105 via depth camera 102 and in the form of color data 107 via color (RGB) imaging camera 104. In one embodiment, the imaging camera 104 is implemented as a wide-angle imaging camera having a fish-eye lens or other wide-angle lens to provide a wide-angle view of the local environment.

The depth camera 102, in one embodiment, uses a modulated light illuminator (not shown) to project a modulated light pattern into the local environment, and uses one or more imaging sensors (not shown) to capture reflections of the modulated light pattern as it reflects back from objects in the local environment. In some embodiments, the illuminator emits infrared (IR) light. In some embodiments, the illuminator is a vertical cavity surface emitting laser (VCSEL). A VCSEL emits light from a larger surface than a laser, and therefore emits more light while still being safe for eyes. In some embodiments, the illuminator is coupled with a suitable mask (not shown) to emit structured light (i.e., modulated light patterns). In some embodiments, these modulated light patterns are temporally-modulated light patterns. The captured reflections of the modulated light patterns are referred to herein as "depth maps." In some embodiments, the depth camera 102 captures depth maps at a rate of approximately 200 frames per second, wherein each frame includes depth data for a particular time period.

The processor 110 includes a memory 115, a data volume 120, a reference volume 125, a sparse correspondence module 130, a dense correspondence module 135, a final matching module 140, and a skinning module 145. The memory 115 is a memory device generally configured to store the depth data 105 and the color data 107, and therefore may be a random access memory (RAM) memory module, non-volatile memory device (e.g., flash memory), and the like. The memory 115 may form part of a memory hierarchy of the electronic device 100 and may include other memory modules, such as additional caches not illustrated at FIG. 1. The memory 115 is configured to receive and store the depth data 105 from the depth camera 102 and the color data 107 from the color camera 104.

The processor 110 generates a textured mesh (also referred to as a three-dimensional (3D) point cloud) based on the depth data 105 and the color data 107, and maintains the textured mesh at a data volume 120. The data volume 120 includes the textured mesh corresponding to a current frame, referred to as the current data mesh frame 117. The processor 110 also maintains a reference volume 125, also referred to as a key volume. Initially, the processor 110 sets the first data mesh frame 117 as the reference, or key, frame, and performs a non-rigid alignment between the key frame and a new data mesh frame so that data of the new data mesh frame can be fused into the key frame. In some embodiments, the processor 110 uses a truncated signed distance function (TSDF) at the reference volume 125 to volumetrically fuse the new data mesh to the key frame. If the processor 110 determines that an alignment error between a new data mesh frame and the key frame is above a threshold, the processor 110 sets the new data mesh frame as the current key frame.

The sparse correspondence module 130 is configured to find correspondences between the 3D meshes of the new data mesh frame 117 and the reference volume 125. In some embodiments, the sparse correspondence module 130 builds an affinity matrix $$A = \exp\left(-\frac{D^2}{2\sigma^2}\right)$$

for every node (3D point) in the mesh (graph). The affinity matrix encodes the similarity of every node in the graph based on their distances D, which approximates a Kernel function to encode non-linearities in the data mesh. The sparse correspondence module 130 then decomposes the affinity matrix A using the SVD decomposition in $A=USV^T$ and the first k-1 eigenvectors $u_2, \ldots, u_k$ are used as new space to facilitate finding correspondences. The sparse correspondence module 130 discards the first eigenvector which is associated with the eigenvalue 0 and is a constant vector.

In some embodiments, the sparse correspondence module 130 learns to approximate embedded points from a set of 3D points $X \in R^{n \times 3}$ representing the current data mesh frame 117, a process referred to herein as "spectral embedding". The sparse correspondence module 130 relates the affinity matrix A to a non-linear mapping of the input space, similar to an approximate Kernel function. The sparse correspondence module 130 therefore treats the embedded space as a target output that is to be learned. In some embodiments, the sparse correspondence module 130 learns a function $f(X)=Y \in R^{k \times n}$, where Y are the first k eigenvectors of the affinity matrix A. By learning the function $f(X)$, the sparse correspondence module 130 avoids building the affinity matrix A and performing its SVD decomposition.

The sparse correspondence module 130 learns a non-linear mapping $\phi(X)$ of the point cloud and a regression function W that minimizes the loss:

$$\operatorname*{argmin}_{W} \mathcal{L}(\phi(X)W, Y) + \Gamma(W) \tag{1}$$

where $Y \in R^{k \times n}$ is the embedded space and $\Gamma(W)$ is a regularization term to avoid overfitting, which the sparse correspondence module 130 sets to be the $\ell_2$-norm of W. The sparse correspondence module 130 avoids computing a Kernel matrix A of the data by approximating the Kernel matrix via random features and setting $$\phi(X) = \exp\left(i\frac{XF}{\sigma_f}\right),$$

where $F \in R^{3 \times F}$ is randomly generated from a Gaussian distribution.

In some embodiments, the sparse correspondence module 130 uses spatial pooling to summarize the point cloud of the data mesh frame 117 and capture both global and local structures. The sparse correspondence module 130 performs an additional non-linear mapping $$\Psi = \exp\left(i\frac{XF_2}{\sigma_f}\right)$$

and computes its max-pooling over all the points n to obtain a single compact descriptor $\Psi=\max_i \Psi_i \in R^F$ where the sparse correspondence module 130 sets the same number of random features F. In order to capture both global and local information for each point x in the point cloud X, the sparse correspondence module 130 aggregates the descriptors $\phi(x)$ and $\psi$ with a simple subtraction $\Phi=\phi(x)-\psi$.

In some embodiments, the processor 110 trains the sparse correspondence module 130 by collecting point clouds $X_1, \ldots X_N$ and randomly subsamples a number of points (e.g., 256 points) from each point cloud. Each point cloud represents a particular subject performing a particular pose (such as, for example, a person holding his body in a particular pose). The processor 110 computes the embedded space $Y_1, \ldots Y_N$ using an offline process. The processor 110 then remaps the input point clouds to $\Phi_1, \ldots \Phi_N$ and minimizes the following loss function:

$$\operatorname*{argmin}_{W} \sum \|Y_i - \Phi_i W\|^2 + \lambda \|W\|^2 \quad (2)$$

In some embodiments, at runtime, given two meshes $\mathcal{M}_1$ and $\mathcal{M}_2$, the processor 110 randomly subsamples the meshes to, for example, 256 3D coordinates $X_1$ and $X_2$, computes their non-linear mappings $\Phi_1$ and $\Phi_2$, and generates the embedded spaces $Y_1=\Phi_1 W$ and $Y_2=\Phi_2 W$. In the embedded space, the sparse correspondence module 130 retrieves closest-point correspondences and uses the correspondences for initialization of a correspondence field between the current data mesh frame 117 and the reference volume 125.

The dense correspondence module 135 is configured to identify non-rigid alignment parameters that warp the mesh at the reference volume 125 to the current data mesh frame 117. The dense correspondence module 135 runs both forward matching (reference volume 125 to data volume 120) and backward matching (data volume 120 to reference volume 125) to find dense correspondences between the reference volume 125 and the data volume 120. The dense correspondence module 135 uses the sparse correspondences identified by the sparse correspondence module 130 as a data term in the optimization problem of the forward matching. The data term penalizes the distance between the warped reference point to its corresponding data point. The dense correspondence module 135 uses the dense correspondences as residuals in a final non-rigid matching phase, after which the current data mesh frame 117 is fused with the reference volume 125 to generate a model encoding the shape of a subject in the environment of the electronic device 100.

In some embodiments, the dense correspondence module 135 uses an embedded deformation (ED) graph-based method for non-rigid matching. The dense correspondence module 135 uniformly samples ED nodes from the vertices of a reference mesh, representing the i-th node location as $g_i$. The dense correspondence module 135 associates each ED node with a set of parameters that represent the deformation the ED node imposes in its local neighborhood. The dense correspondence module 135 connects neighboring ED nodes together to form an ED graph, and uses G to collectively represent the deformation parameters and ED node locations on the ED graph. The dense correspondence module 135 "skins" each mesh vertex to K neighboring ED nodes so that the mesh will be deformed according to the parameters of the ED graph.

The dense correspondence module 135 identifies the ED graph parameters that deform the reference volume 125 to fit the current data mesh 117. The dense correspondence module 135 parameterizes the deformation at each ED node as an affine transformation. In some embodiments, the affine transformation has 12 parameters (a 3×3 matrix A together with a 3D vector t). Using Linear Blend Skinning, the dense correspondence module 135 applies a transformation to warp a vertex v at the reference volume 125 to a corresponding vertex v at the current data mesh frame 117, wherein the transformation is denoted as $\tilde{v}(G)=\Sigma_{k=1}^{K} w_i(A_k(v-g_k)+g_k+t_k)$. In some embodiments, the dense correspondence module 135 adds a regularization on A as a soft constraint to enforce A as close to a rotation matrix as possible.

In some embodiments, the dense correspondence module 135 represents A as a quaternion q without explicitly forcing q to be unitary, but instead treating $\|q\|=1$ as a soft constraint. To warp a vertex v, the dense correspondence module 135 performs $$\tilde{v}(G)=\Sigma_k w_i(R(q_k)(v-g_k)+g_k+t_k), \quad (3)$$

where R(•) converts a quaternion to a rotation matrix. In some embodiments, because the dense correspondence module 135 does not explicitly force q to be unitary, R(q) becomes a rotation matrix multiplied by a scalar. In some embodiments, the dense correspondence module 135 uses linear blending rather than quaternion blending to conserve computational resources while maintaining a high frame rate.

The dense correspondence module 135 is configured to perform two-way non-rigid matching between the reference volume 125 and the data volume 120. The dense correspondence module 135 aligns the reference volume 125 to the data volume 120 (forward matching) and then aligns the data volume 120 to the reference volume 125 (backward matching), based on which the dense correspondence module 135 identifies optimized point-to-point correspondences between the reference volume 125 and the data volume 120.

For forward matching, the dense correspondence module 135 matches the reference volume 125 to the data volume 120 by measuring the misalignment between the reference mesh and the input depth maps of the data volume 120 using a projective point-to-plane distance:

$$E_{data}(G)=\Sigma_m \Sigma_n \delta_{mn}(\tilde{n}^T(\tilde{v}_m-\Gamma_n(\tilde{v}_m)))^2, \quad (4)$$

where $\tilde{v}$ is the warped vertex as defined in Equation (3), m and n are the indices of the vertex and the depth map, respectively, and $\Gamma_n(v)$ represents the corresponding projective 3D point of v from the n-th depth map. $\delta_{mn}$ represents the visibility test for $\tilde{v}_m$ where $\delta_{mn}=1$ if it is visible in the n-th depth map, and $\delta_{mn}=0$ otherwise. In some embodiments, the dense correspondence module 135 additionally integrates the visual hull term and the learned correspondence term from Equation (1). In some embodiments, the dense correspondence module 135 adds regularization terms to enforce the smoothness of the non-rigid motion field. In some embodiments, the dense correspondence module 135 adds a color term to minimize drift.

After establishing the forward alignment, the dense correspondence module 135 pairs each vertex $v_m$ on the reference surface with its corresponding point $p_m^{fwd}$ on the current data mesh frame 117 (which as been volumetrically fused from the input depth maps 105). The dense correspondence module 135 lets $p_m^{fwd}$ denote the closest surface point of $\tilde{v}_m$, and discards a corresponding pair if their distance is greater than a threshold (e.g., 2 mm) to generate a correspondence set $\{(v_m, p_m^{fwd})\}$.

For backward matching, the dense correspondence module 135 uses Equation (3) to warp the ED nodes of the reference to the data pose (g→g+t). The dense correspondence module 135 then update the node-node connectivity based on the mesh topology at the depth data 105. The dense correspondence module 135 then uses the updated ED graph for backward matching, where the dense correspondence module 135 finds correspondences with the current data mesh frame 117 for each of the vertices of the reference volume 120: $\{(v_m, p_m^{bwd})\}$. The dense correspondence module 135 re-uses the ED graph instead of resampling a new ED graph from the current data mesh frame 117, thereby preserving the correct ED node connectivity during the alignment of the reference volume 125 representing open topology to the current data mesh frame 117 representing closed topology, in which case the ED graph from the reference volume 125 will have the correct connectivity but the resampled ED graph at the current data mesh frame 117 will have the incorrect connectivity.

The dense correspondence module 135 aligns the data mesh to the reference TSDF volume $\mathbb{V}(\bullet)$ using the following data term to measure the misalignment:

$$E_{tsdf}(G)=\Sigma_m|\tilde{\mathbb{V}}(\tilde{v})|^2 \qquad (5)$$

where $\mathbb{V}(\bullet)$ defines the signed distance function at fixed regular lattice points and $\tilde{\mathbb{V}}(\bullet)$ is a continuous volume field sampled through the trilinear interpolation of $\mathbb{V}(\bullet)$ at any given point. The dense correspondence module 135 initializes the parameters at each ED node for the backward matching as the inverse of the forward transformation at that node:

$$q^{bwd}=q^{-1} \text{ and } t^{bwd}=-t.$$

The final matching module 140 is configured to identify the best correspondence for each vertex at the reference volume: $\{(v_m, p_m)\}$. If the final matching module 140 identifies the forward correspondence as having the best correspondence with the current data mesh frame 117 for a reference vertex v, the processor 110 treats the vertex v as having a reliable correspondence with the current data mesh frame 117 given the reference mesh topology at the reference volume 125. If the final matching module 140 identifies the backward correspondence as having the best correspondence with the current data mesh frame 117 for the reference vertex v, the final matching module 140 updates the skinning results (both ED node set and weights) for the reference vertex v to match the topology at the current data mesh frame 117. The final matching module 140 performs a final matching to align the reference volume 125 to the data volume 120 with the updated graph connectivity and vertex skinning, using the extracted correspondences as residuals:

$$E_{corr}=\Sigma_m\|\tilde{v}_m-p_m\|^2 \qquad (6)$$

In some embodiments, the final matching module 140 adds an energy term to measure photo-consistency between per-vertex colors on the reference mesh at the reference volume 125 and the observed color for the mesh vertices from the color data 107: $\{I_n\}_{n=1}^N$. By adding the energy term, the final matching module 140 addresses drift that can occur when the point-to-plane data term used in the forward matching does not constrain a vertex's movement along the tangent plane. The final matching module 140 formulates the energy term as:

$$E_{clr}=\Sigma_m\Sigma_n\delta_{mn}\|I_n(\Pi_n(\tilde{v}_m))-c_m\|^2, \qquad (7)$$

where $\Pi_n(\tilde{v})$ projects the warped reference vertex projected to the n-th color image space (2D image coordinate), $\delta_{mn}$ is the visibility term as in Equation (4), and $c_m$ represents the 3D color vector of the m-th vertex on the reference mesh. In some embodiments, the final matching module 140 collapses the 3D color into a single intensity (grayscale) value, which reduces the computation requirement for the $J^TJ$ evaluation. In some embodiments, to further reduce the compute, the final matching module 140 collapses multiple residuals on the same vertex into one, incorporating instead the residuals:

$$E_{clr}=\Sigma_m(\Sigma_n w_{mn}\bar{I}_n(\Pi_n(\tilde{v}_m))-\bar{c}_m)^2, \qquad (8)$$

where $\bar{I}$ is an input intensity image and $\bar{c}$ is the per-vertex intensity value, and $w_{mn}$ is the weight on each input view where $\Sigma_n w_{mn}=1$. The weight $w_{mn}$ takes into account visibility and viewing angle.

Voxels in the reference volume 125 sit on regular lattice grid points, but after the forward warp, in some embodiments the final matching module 140 re-samples the TSDF values and weights at the non-uniform grid of the data volume 120. In some cases, voxels corresponding to different surface parts can be warped to the same location. Instead of treating each voxel individually, the final matching module 140 applies the warp function to each volumetric cube (with eight voxels at its corners) on the lattice grid. After warping, the eight voxels can also become non-cuboid. The final matching module 140 discards cubes that are distorted dramatically and assumes the rest approximately have the shape of a cuboid. The final matching module 140 then performs a rasterization process on each warped cuboid to detect all the lattice points of the data volume 120 that sit inside it. The final matching module 140 trilinearly interpolates the TSDF value and weight for each lattice point.

A data voxel can get TSDF values from multiple cubes when a collision occurs. In some embodiments, the final matching module 140 handles collisions with a custom atomic operation. When the final matching module 140 writes a new TSDF value $d^{new}$ to a voxel with an old TSDF value $d^{old}$, the final matching module 140 sets $d=d^{new}$ if either $d^{old}$ is invalid or $|d^{new}|<|d^{old}|$; and sets $d=d^{old}$ otherwise.

The skinning module 145 is configured to perform a relatively fast approximation for geodesic skinning. The skinning module 145 first finds the nearest ED nodes to each vertex using the Euclidean distance. For each ED node, the skinning module 145 solves for the heat equilibrium over the surface, where the heat is transferred from the ED node to only the vertices to which the node was selected as one of its k-nearest ED nodes. The skinning module 145 then solves the linear system for ED node i:

$$(D-t\Delta)w_i=\delta_i, \qquad (9)$$

where D is a diagonal matrix where $D_{ii}$ is the area of vertex I (one third the area of all the triangles incident on vertex i), $\Delta$ is the discrete surface Laplacian calculated using the cotangent formula and using a half-edge data structure for the intermediate representation, t is a temperature hyperparameter, and $\delta_i$ is a one-hot vector indicating the vertex that represents the ED node. In some embodiments, the skinning module 145 samples ED nodes on the mesh manifold by choosing an ED node as the medoid of a set of vertices instead of the centoid. In some embodiments, the skinning module 145 solves the resulting linear systems in parallel with a Gauss-Seidel implementation. When the recovered solution $w_{ij}$ is zero for a vertex j, the skinning module 145 determines that the recovered solution is too distant on the manifold and subsequently detaches the recovered solution from ED node I, thus avoiding distortion artifacts. In some embodiments, the skinning module 145 employs the Euclidean distance during volume warping to conserve computational resources.

Thus, the skinning module 145 associates each vertex (or voxel) in the volume to its neighbor ED nodes, and gives a weight for the association. The non-rigid deformation (i.e., motion field, or pose) is represented as a set of local semi-rigid deformations at each of the ED nodes. Thus, the deformation is initially defined only at the position of the ED nodes. Because the vertices of the mesh (or voxels of the volume) typically do not co-locate with an ED node, the skinning module 145 interpolates the deformation parameters for those mesh vertices (or volume voxels). To perform the interpolation, the skinning module 145 determines the neighboring ED nodes for each mesh vertex (or voxel), and then interpolates the parameters (e.g., by taking the weighted average of the neighboring ED parameters).

Figure 2:
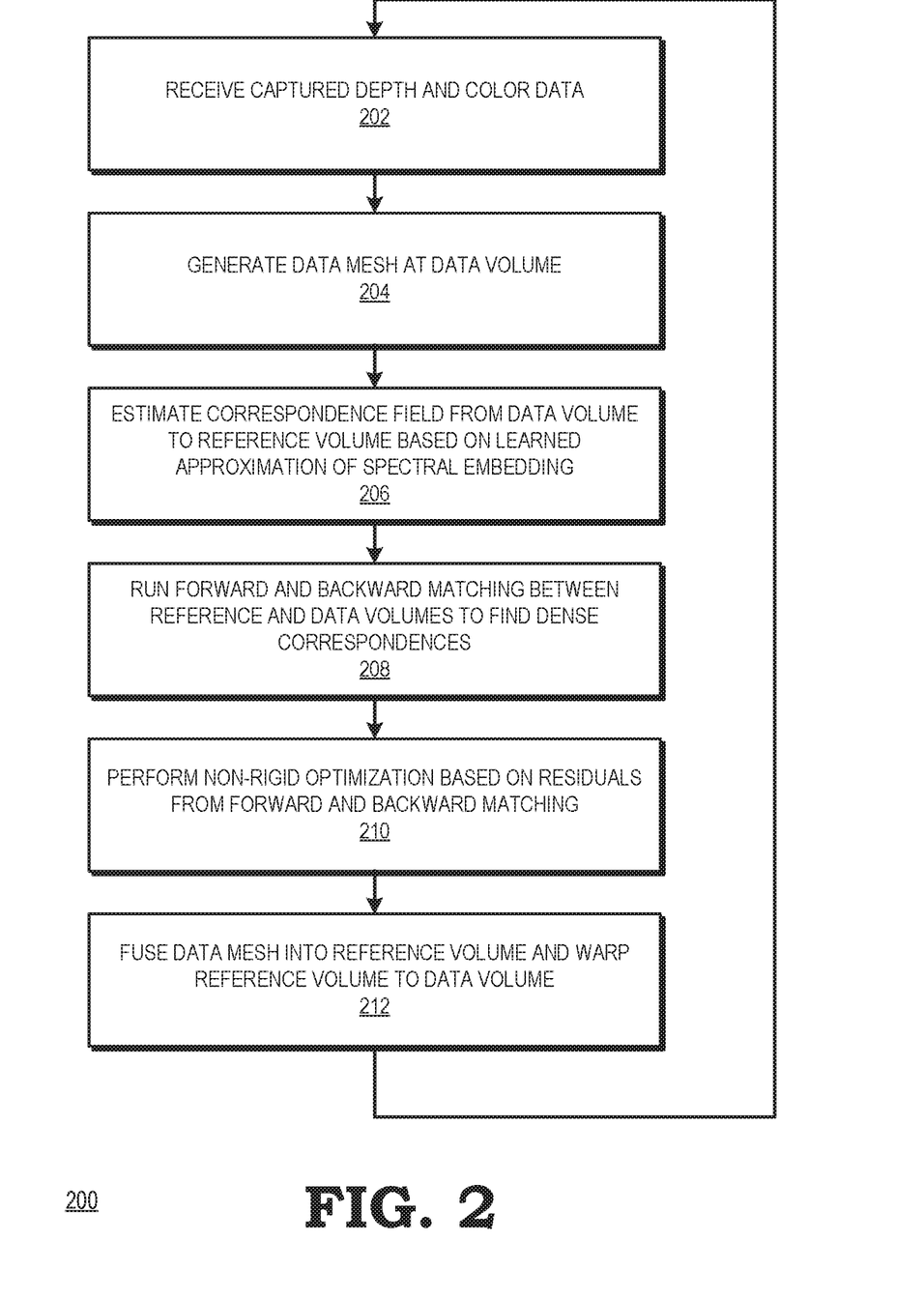
FIG. 2 is a flow diagram illustrating a method of using spectral embedding and backward and forward matching to correlate a data volume and an evolving reference volume to estimate a pose of objects in an environment in accordance with some embodiments.

FIG. 2 is a flow diagram illustrating a method 200 employed by the motion tracking system 100 of FIG. 1 of using spectral embedding and backward and forward matching to correlate a data volume and an evolving reference volume to estimate a pose of objects in an environment in accordance with some embodiments. At block 202, the processor 110 of the motion tracking system 100 of FIG. 1 receives captured depth and color data from the depth camera 102 and the color camera 104. The depth and color data may be in the form of one or more depth maps and color images. At block 204, the processor 110 generates a current data mesh frame 117 which the processor 110 maintains at the data volume 120. At block 206, the sparse correspondence module 130 estimates a correspondence field between the data volume 120 and the reference volume 125 based on a learned approximation of spectral embedding. In some embodiments, the sparse correspondence module 130 uses Equation (1) to estimate the correspondence field.

At block 208, the dense correspondence module 135 runs forward and backward matching between the reference volume 125 and the data volume 120 to find dense correspondences between the meshes. At block 210, the final matching module 140 performs non-rigid optimization based on residuals from the forward and backward matching from the dense correspondence module 135. At block 212, the processor 110 fuses the data mesh into the reference volume 125 and warps the reference volume 125 to the data volume 120, after which the method flow continues back to block 202.

Figure 3:
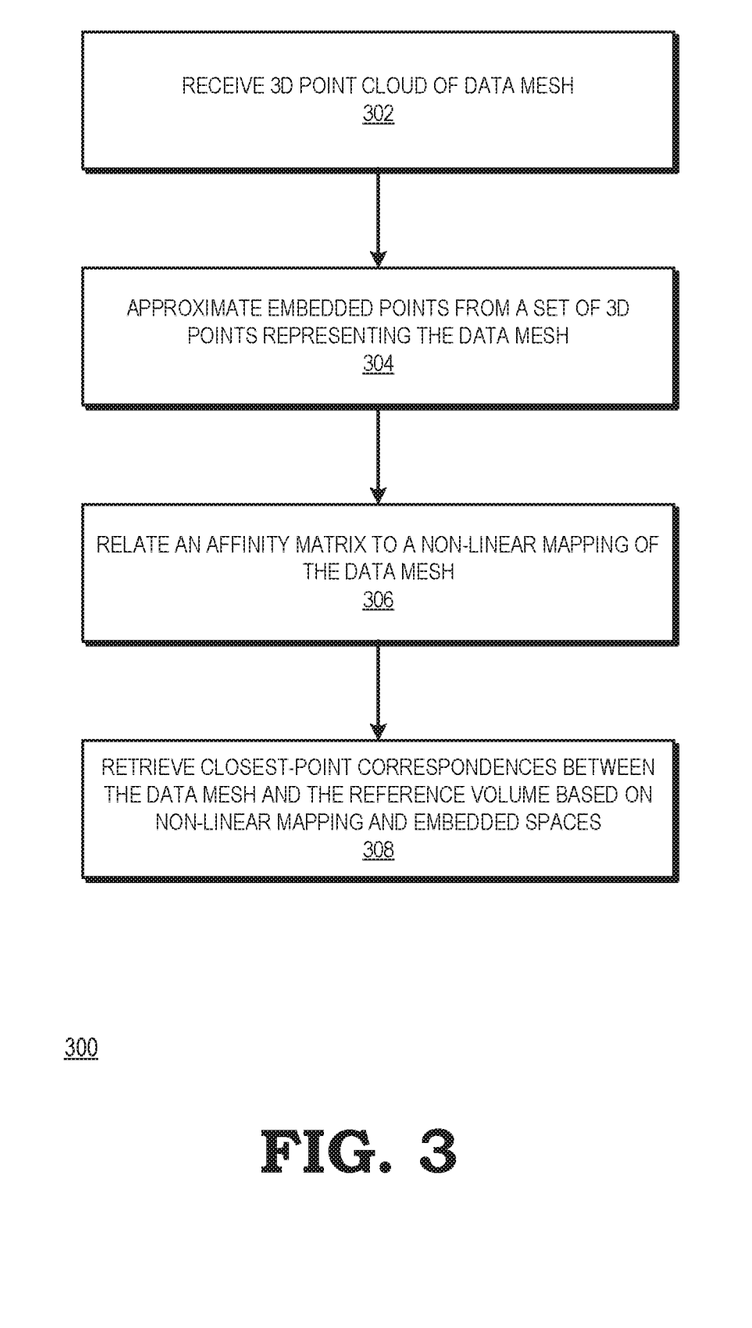
FIG. 3 is a flow diagram illustrating a method of computing a sparse correspondence field between a data volume and a reference volume based on a learned approximation of a spectral embedding of extracted points in accordance with some embodiments.

FIG. 3 is a flow diagram illustrating a method 300 employed by the motion tracking system 100 of FIG. 1 of computing a sparse correspondence field between a data volume and a reference volume based on a learned approximation of a spectral embedding of extracted points in accordance with some embodiments. At block 302, the sparse correspondence module 130 receives the 3D point cloud of the current data mesh frame 117. At block 304, the sparse correspondence module 130 approximates embedded points from a subset of the 3D points of 3D point cloud of the current data mesh frame 117. At block 306, the sparse correspondence module 130 relates an affinity matrix to a non-linear mapping of the current data mesh frame 117. At block 308, the sparse correspondence module 130 retrieves closest-point correspondences between the current data mesh frame 117 and the reference volume 120 based on the non-linear mapping and embedded spaces.

Figure 4:
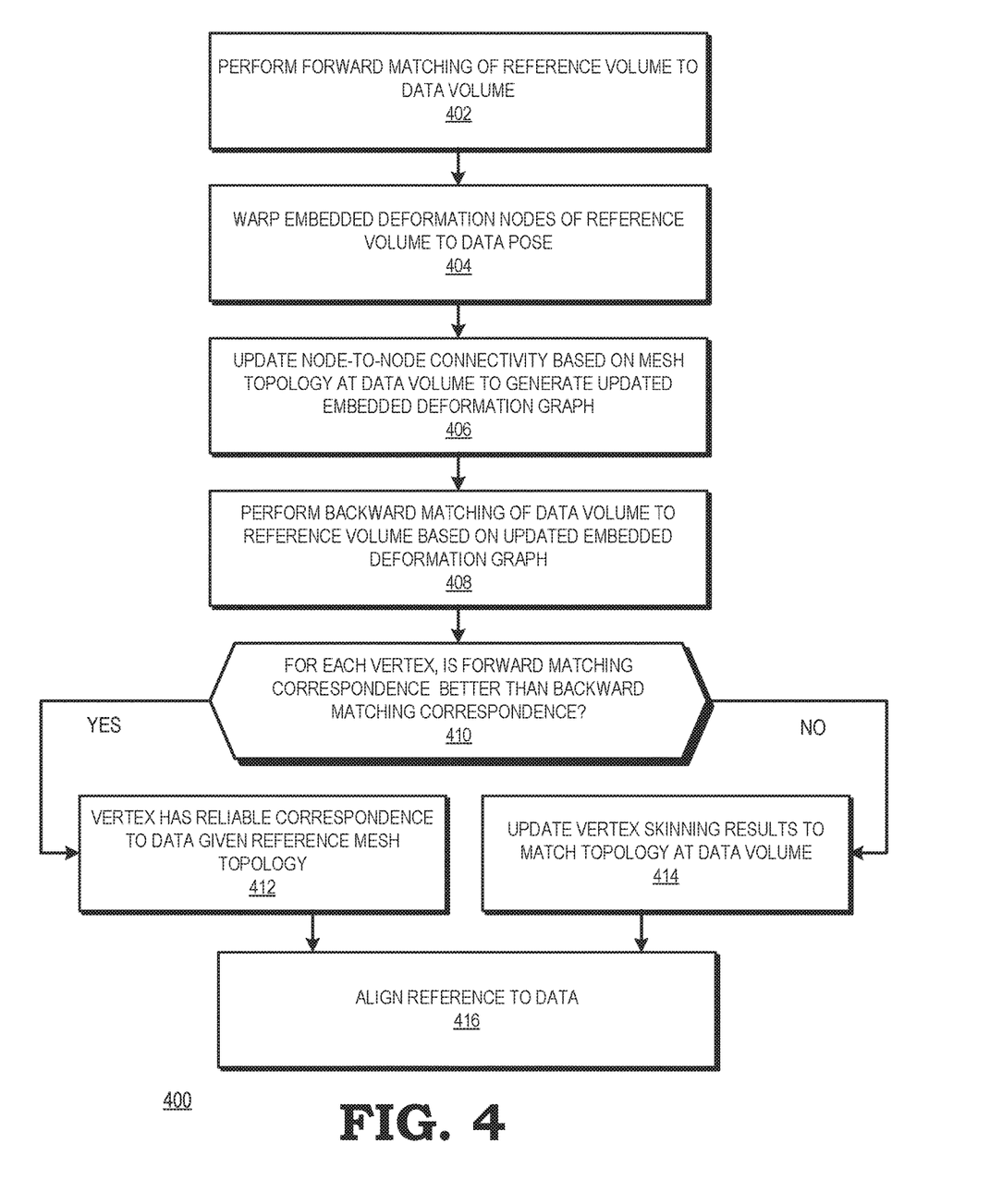
FIG. 4 is a flow diagram illustrating a method of backward and forward matching of a reference volume to a data volume in accordance with some embodiments.

FIG. 4 is a flow diagram illustrating a method 400 employed by the motion tracking system 100 of FIG. 1 of backward and forward matching of a reference volume to a data volume in accordance with some embodiments. At block 402, the dense correspondence module 135 performs forward matching of the reference volume 125 to the data volume 120. At block 404, the dense correspondence module 135 warps the embedded deformation nodes of the reference volume 125 to the pose of the data volume 120. At block 406, the dense correspondence module 135 updates node-to-node connectivity between the meshes of the reference volume 125 and the data volume 120 based on the mesh topology at the data volume 120 to generate an updated embedded deformation graph. At block 508, the dense correspondence module 135 performs backward matching of the data volume 120 to the reference volume 125 based on the updated embedded deformation graph.

At block 410, the dense correspondence module determines, for each vertex, if the forward matching correspondence is better than the backward matching correspondence. For each vertex, if the dense correspondence 135 module determines that the forward matching correspondence is better than the backward matching correspondence, at block 412, the final matching module 140 determines that the vertex has a reliable correspondence to the current data mesh frame 117 given the topology of the mesh at the reference volume 125. If, at block 410, for a given vertex, the dense correspondence module 135 determines that the forward matching correspondence is not better than the backward matching correspondence, at block 414, the final matching module 140 updates the vertex skinning results for the vertex to match the topology of the current data mesh frame 117 at the data volume 120. At block 416, the final matching module 140 aligns the reference frame 125 to the data frame 120.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   computing a current data mesh frame based on at least one depth data frame captured at one or more depth cameras of an electronic device and at least one color data frame captured at one or more color cameras, wherein the current data mesh frame comprises a three-dimensional (3D) point cloud representing an environment of the electronic device;
   maintaining a data volume comprising the current data mesh frame;
   maintaining a reference volume comprising a plurality of fused data mesh frames based on previously captured depth data frames and color data frames;
   computing an initial correspondence between the data volume and the reference volume based on spectral embedding, wherein computing the initial correspondence comprises computing embedded points from a summarized 3D point cloud based on non-linear mappings to generate a correspondence field between the data volume and the reference volume; and
   estimating a current pose of at least one object in the environment based on the initial correspondence.

2. The method of claim 1, wherein computing the initial correspondence further comprises:
   summarizing the 3D point cloud of the data volume and the reference volume based on spatial pooling.

3. The method of claim 2, further comprising:
   aligning the reference volume with the data volume;
   calculating an alignment error between the data volume and the reference volume based on the non-linear mappings; and
   resetting the reference volume to comprise the current data mesh frame in response to identifying that the alignment error between the data volume and the reference volume exceeds a threshold value.

4. The method of claim 1, further comprising:
   identifying non-rigid alignment parameters to warp the reference volume to a pose of the current data mesh frame.

5. The method of claim 1, further comprising computing a dense correspondence between the data volume and the reference volume comprising:
   aligning the data volume to the reference volume to generate an embedded deformation graph comprising a plurality of vertices; and
   aligning the reference volume to the data volume based on the embedded deformation graph to identify correspondences between the vertices of the reference volume and the data volume.

6. The method of claim 1, wherein computing the initial correspondence comprises computing an affinity matrix encoding a similarity between each 3D point of the 3D point cloud of the data volume.

7. A method comprising:
   computing a current data mesh frame based on at least one depth data frame captured at one or more depth cameras of an electronic device and at least one color data frame captured at one or more color cameras, wherein the current data mesh frame comprises a three-dimensional (3D) point cloud representing an environment of the electronic device;
   maintaining a data volume comprising the current data mesh frame;
   maintaining a reference volume comprising a plurality of fused data mesh frames based on previously captured depth data frames and color data frames;
   computing an initial correspondence between the data volume and the reference volume based on spectral embedding;
   computing a dense correspondence between the data volume and the reference volume comprising:
      aligning the data volume to the reference volume to generate an embedded deformation graph comprising a plurality of vertices, wherein aligning the data volume to the reference volume comprises matching a color value of each vertex of the data volume to a color value of each corresponding vertex of the reference volume; and
      aligning the reference volume to the data volume based on the embedded deformation graph to identify correspondences between the vertices of the reference volume and the data volume; and
   estimating a current pose of at least one object in the environment based on the initial correspondence.

8. The method of claim 7, further comprising representing the color value of each vertex of the data volume and the color value of each corresponding vertex of the reference volume as a single intensity value.

9. A method, comprising:
capturing depth data of an environment at one or more depth cameras of an electronic device;
capturing color data of the environment at one or more color cameras of the electronic device;
computing a current data mesh frame comprising corresponding three-dimensional (3D) points of 3D point clouds based on the depth data and the color data;
maintaining a data volume comprising the current data mesh frame;
fusing the current data mesh frame to a plurality of previously computed data mesh frames to generate a reference volume;
computing a sparse correspondence between the data volume and the reference volume based on spectral embedding, wherein computing the sparse correspondence comprises computing embedded points from summarized 3D point clouds of the data volume based on non-linear mappings to generate a correspondence field between the data volume and the reference volume;
computing a dense correspondence between the data volume and the reference volume based on a non-rigid alignment; and
estimating a current pose of at least one object in the environment based on the sparse correspondence.

10. The method of claim 9, wherein computing the sparse correspondence further comprises:
summarizing the 3D point clouds of the data volume and the reference volume based on spatial pooling.

11. The method of claim 10, further comprising:
calculating an alignment error between the data volume and the reference volume based on the non-linear mappings; and
resetting the reference volume to comprise the current data mesh frame in response to identifying that the alignment error between the data volume and the reference volume exceeds a threshold value.

12. The method of claim 9, further comprising:
solving for non-rigid alignment parameters to warp the reference volume to a pose of the current data mesh frame.

13. The method of claim 9, wherein computing the dense correspondence between the data volume and the reference volume comprises:
aligning the data volume to the reference volume to generate an embedded deformation graph comprising a plurality of vertices; and
aligning the reference volume to the data volume based on the embedded deformation graph to identify correspondences between the reference volume and the data volume.

14. The method of claim 9, wherein computing the sparse correspondence comprises computing an affinity matrix encoding a similarity between each 3D point of the 3D point clouds of the data volume and the reference volume.

15. A method, comprising:
capturing depth data of an environment at one or more depth cameras of an electronic device;
capturing color data of the environment at one or more color cameras of the electronic device;
computing a current data mesh frame comprising corresponding three-dimensional (3D) points of 3D point clouds based on the depth data and the color data;
maintaining a data volume comprising the current data mesh frame;
fusing the current data mesh frame to a plurality of previously computed data mesh frames to generate a reference volume;
computing a sparse correspondence between the data volume and the reference volume based on spectral embedding;
computing a dense correspondence between the data volume and the reference volume based on a non-rigid alignment, wherein computing the dense correspondence between the data volume and the reference volume comprises:
aligning the data volume to the reference volume to generate an embedded deformation graph comprising a plurality of vertices;
aligning the reference volume to the data volume based on the embedded deformation graph to identify correspondences between the reference volume and the data volume; and
representing a color value of each vertex of the data volume and a color value of each corresponding vertex of the reference volume as a single intensity value; and
estimating a current pose of at least one object in the environment based on the sparse correspondence.

16. An electronic device comprising:
at least one depth camera to capture depth data of an environment of the electronic device; and
a processor to:
compute a current data mesh frame comprising a three-dimensional (3D) point cloud of the environment of the electronic device based on at least one depth data frame captured at the at least one depth camera of the electronic device;
maintain a data volume comprising the current data mesh frame;
maintain a reference volume comprising a plurality of fused data mesh frames based on previously captured depth data frames and color data frames;
compute a sparse correspondence between the data volume and the reference volume based on spectral embedding, wherein the processor is to compute the sparse correspondence based on computing embedded points from a summarized 3D point cloud based on non-linear mappings to generate a correspondence field between the data volume and the reference volume; and
estimate a current pose of at least one object in the environment based on the sparse correspondence.

17. The electronic device of claim 16, wherein the processor is to compute the sparse correspondence based on:
summarizing the 3D point cloud of the data volume and the reference volume based on spatial pooling.

18. The electronic device of claim 17, wherein the processor is further to:
calculate an alignment error between the data volume and the reference volume based on the non-linear mappings; and
reset the reference volume to comprise the current data mesh frame in response to identifying that the alignment error between the data volume and the reference volume exceeds a threshold value.

19. The electronic device of claim 16, wherein the processor is further to:
solve for non-rigid alignment parameters to warp the reference volume to a pose of the current data mesh frame.

20. The electronic device of claim 16, wherein the processor is further to compute a dense correspondence between the data volume and the reference volume based on:
- aligning the data volume to the reference volume to generate an embedded deformation graph comprising a plurality of vertices; and
- aligning the reference volume to the data volume based on the embedded deformation graph to identify correspondences between the reference volume and the data volume.

* * * * *